United States Patent
Kanai et al.

(10) Patent No.: US 9,405,350 B2
(45) Date of Patent: Aug. 2, 2016

(54) MEMORY CONTROL DEVICE, SEMICONDUCTOR DEVICE, AND SYSTEM BOARD

(71) Applicant: KABUSHIKI KAISHA TOSHIBA, Minato-ku, Tokyo (JP)

(72) Inventors: Tatsunori Kanai, Kanagawa (JP); Tetsuro Kimura, Tokyo (JP); Koichi Fujisaki, Kanagawa (JP); Junichi Segawa, Kanagawa (JP); Akihiro Shibata, Tokyo (JP); Masaya Tarui, Kanagawa (JP); Satoshi Shirai, Kanagawa (JP); Yusuke Shirota, Kanagawa (JP); Hiroyoshi Haruki, Kanagawa (JP); Haruhiko Toyama, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 451 days.

(21) Appl. No.: 13/786,706

(22) Filed: Mar. 6, 2013

(65) Prior Publication Data

US 2014/0013138 A1    Jan. 9, 2014

(30) Foreign Application Priority Data

Jul. 6, 2012 (JP) .................................. 2012-152108

(51) Int. Cl.
    *G06F 1/32*     (2006.01)
    *G06F 1/04*     (2006.01)
(52) U.S. Cl.
    CPC ................. *G06F 1/3237* (2013.01); *G06F 1/04* (2013.01)
(58) Field of Classification Search
    CPC ............. G06F 1/3237; G06F 1/32; G06F 1/04
    See application file for complete search history.

(56) References Cited

U.S. PATENT DOCUMENTS 7,187,220 B1    3/2007    Alben et al.
7,315,957 B1    1/2008    Wagner et al.
(Continued)

FOREIGN PATENT DOCUMENTS

JP    2003-131935    5/2003
JP    2004-326153    11/2004
(Continued)

OTHER PUBLICATIONS

Japanese Office Action for Japanese Patent Application No. 2012-152108 mailed on Jun. 17, 2014.
(Continued)

*Primary Examiner* — Thomas Lee
*Assistant Examiner* — Chad Erdman
(74) *Attorney, Agent, or Firm* — Amin, Turocy & Watson LLP

(57) ABSTRACT

According to an embodiment, a memory control device controls a memory from/to which data are read/written by a processor. The memory control device includes a clock switcher and a control signal switcher. The clock receives as input a first clock and a second clock at a higher frequency than the first clock, supplies the first clock to the memory until the second clock becomes stable, and supplies the second clock after the second clock has become stable. The a control signal switcher starts supplying, to the memory, a first control signal for initializing the memory to a state allowing reading/writing of data by the processor while the first clock is being supplied to the memory, and supplies, to the memory, a second control signal according to the reading/writing of data by the processor, after the second clock is supplied to the memory and the memory is initialized.

12 Claims, 11 Drawing Sheets

(56) References Cited

U.S. PATENT DOCUMENTS

| | | |
|---|---|---|
| 7,362,132 B2 | 4/2008 | Imafuku |
| 7,392,372 B2 | 6/2008 | Chu et al. |
| 7,640,449 B2 | 12/2009 | Ham |
| 2003/0043684 A1* | 3/2003 | Johnson et al. ............... 365/233 |
| 2003/0061425 A1* | 3/2003 | Kobori .......................... 710/260 |
| 2003/0084235 A1 | 5/2003 | Mizuki |
| 2006/0187226 A1 | 8/2006 | Bruno et al. |
| 2007/0070793 A1 | 3/2007 | Do |
| 2007/0208964 A1 | 9/2007 | Sandon et al. |
| 2009/0113157 A1 | 4/2009 | Miyatake et al. |
| 2009/0327792 A1 | 12/2009 | Salmon et al. |
| 2012/0072650 A1* | 3/2012 | Suzumura et al. ............ 711/103 |
| 2012/0159230 A1* | 6/2012 | Chen ............................. 713/600 |
| 2012/0213020 A1* | 8/2012 | Ware .................. G06F 13/1684 365/193 |
| 2012/0246356 A1 | 9/2012 | Shibata et al. |
| 2012/0246390 A1 | 9/2012 | Kanai et al. |
| 2012/0246501 A1 | 9/2012 | Haruki et al. |
| 2012/0246503 A1 | 9/2012 | Fujisaki et al. |
| 2013/0073812 A1 | 3/2013 | Kanai et al. |
| 2013/0080812 A1 | 3/2013 | Shirota et al. |
| 2013/0080813 A1 | 3/2013 | Tarui et al. |
| 2013/0083611 A1* | 4/2013 | Ware .................. G11C 11/4072 365/191 |
| 2013/0091372 A1 | 4/2013 | Kimura et al. |
| 2013/0191670 A1 | 7/2013 | Haruki et al. |
| 2013/0219203 A1 | 8/2013 | Fujisaki et al. |
| 2013/0254773 A1 | 9/2013 | Kimura et al. |
| 2013/0268781 A1 | 10/2013 | Kanai et al. |

FOREIGN PATENT DOCUMENTS

| | | |
|---|---|---|
| JP | 2007-058593 | 3/2007 |
| JP | 2007-323164 | 12/2007 |
| JP | 2009-110567 | 5/2009 |
| TW | 200713313 | 4/2007 |

OTHER PUBLICATIONS

Office Action for Taiwanese Patent Application No. 102104247 dated Apr. 10, 2015, 6 pages.

Office Action of Notice of Rejection for Japanese Patent Application No. 2014-253310 dated Mar. 3, 2015, 4 pages.

Chinese Office Action for Chinese Patent Application No. 201310046903.9 mailed on Nov. 10, 2015.

* cited by examiner

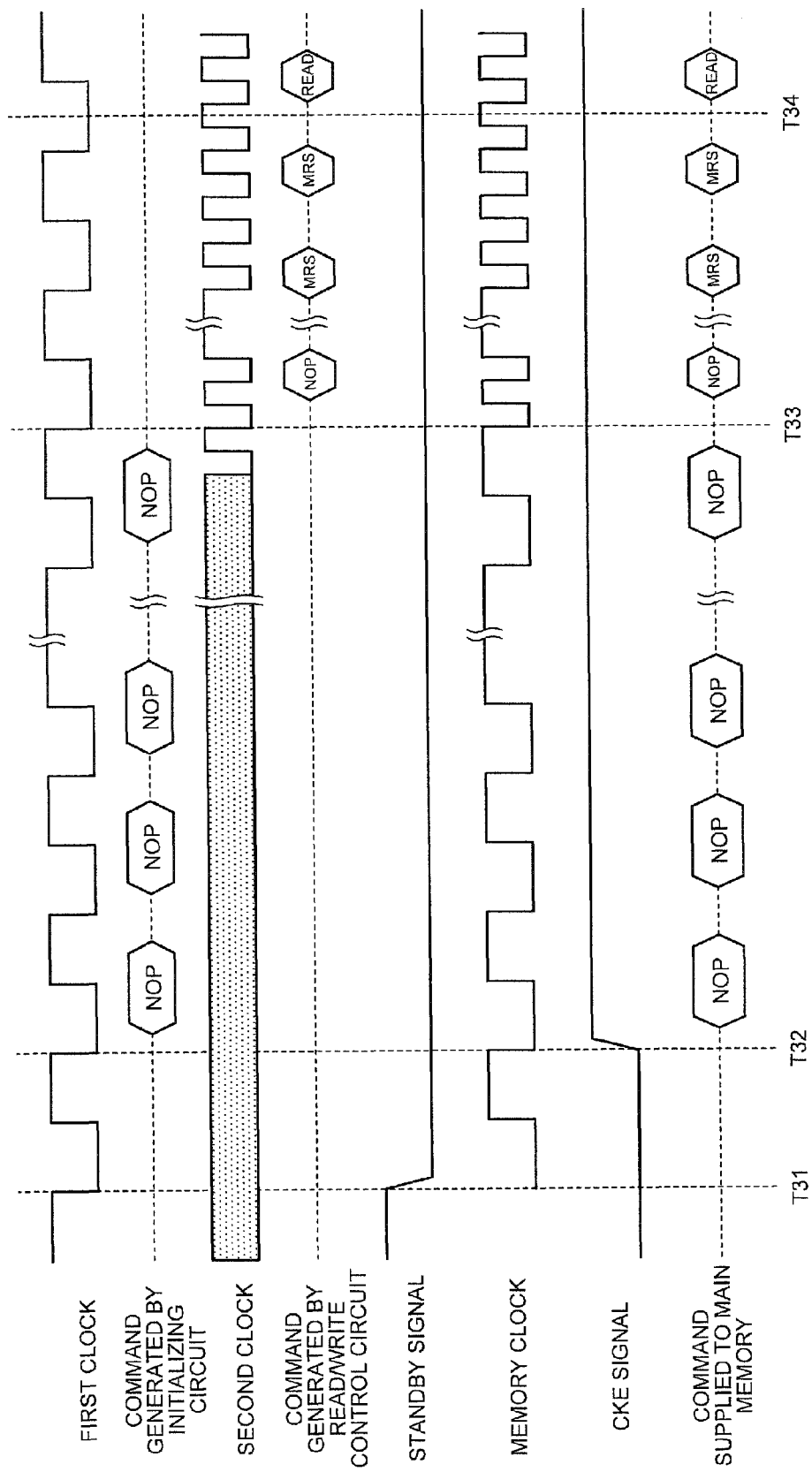

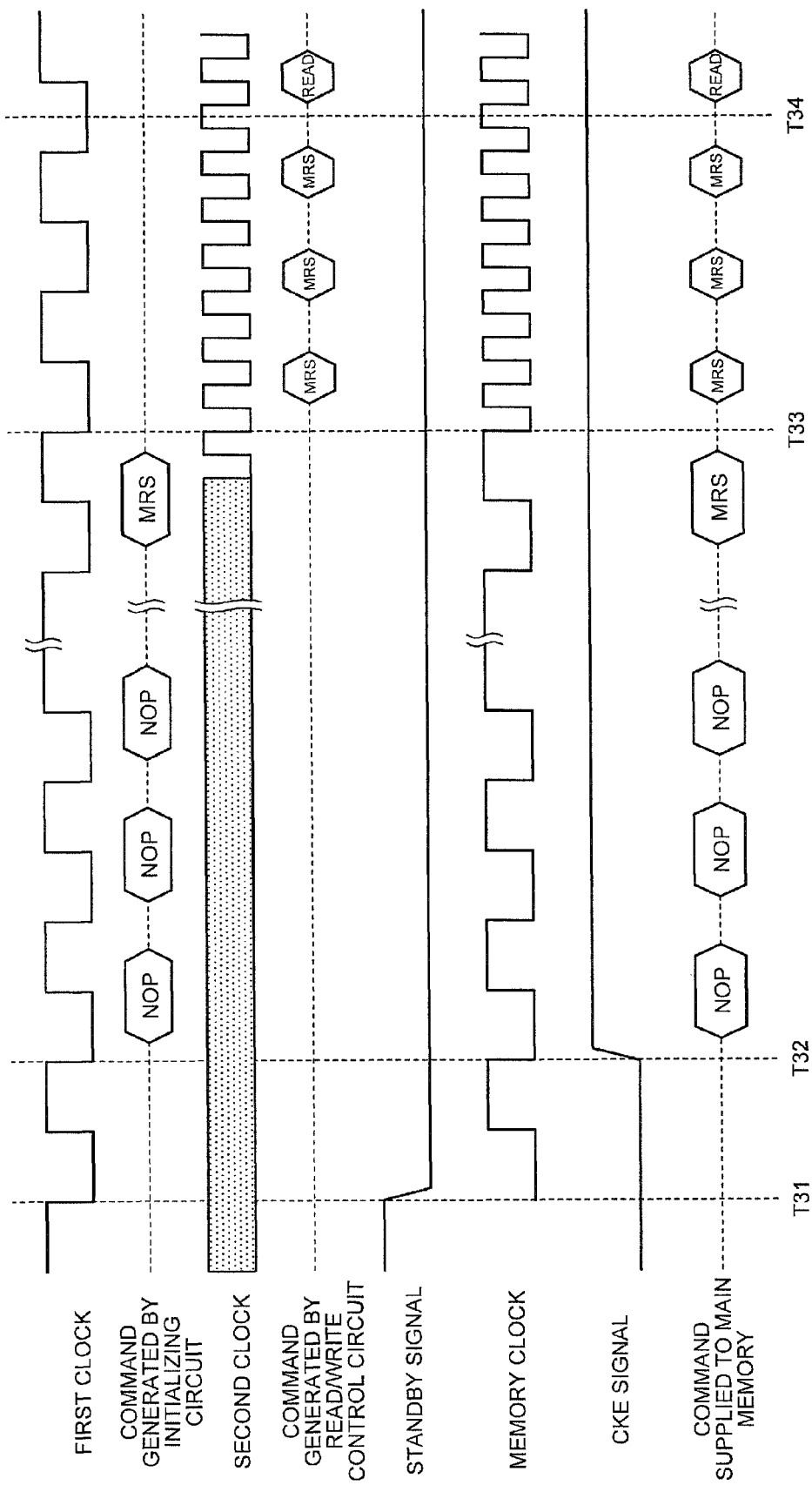

MEMORY CONTROL DEVICE, SEMICONDUCTOR DEVICE, AND SYSTEM BOARD

CROSS-REFERENCE TO RELATED APPLICATIONS

This application is based upon and claims the benefit of priority from Japanese Patent Application No. 2012-152108, filed on Jul. 6, 2012; the entire contents of which are incorporated herein by reference.

FIELD

Embodiments described herein relate generally to a memory control device, a semiconductor device, and a system board.

BACKGROUND

It is desirable that portable information processing devices such as tablet devices and smart phones operate with effective use of limited power. Reduction in power consumption of information processing devices is therefore a major issue.

Power consumption of an information processing device can be reduced by stopping a high-frequency oscillator that is a clock source in processing tasks by a processor when the processor is in a standby state (a state in which the processor continues waiting for an interrupt) waiting for an input from a device. Power consumption of an information processing device can further be reduced by stopping power supply to a memory from/to which data are read/written by a processor in the standby state.

When the processor receives an interrupt and the information processing device resumes from the standby state, however, there is a problem that it takes time for the processor to be ready for reading/writing data from/to the memory if the high-frequency oscillator is first started and the memory is then initialized after the clock has become stable.

BRIEF DESCRIPTION OF THE DRAWINGS

FIG. 11 is a timing chart for explaining operation of the memory controller according to the embodiment; and FIG. 12 is a timing chart for explaining operation of the memory controller according to the embodiment.

DETAILED DESCRIPTION

According to an embodiment, a memory control device controls a memory from/to which data are read/written by a processor. The memory control device includes a clock switcher and a control signal switcher. The clock switcher receives a first clock and a second clock of which clock frequency is higher than that of the first clock, supplies the first clock to the memory until the second clock becomes stable, and supplies the second clock after the second clock has become stable. The control signal switcher starts supplying, to the memory, a first control signal for initializing the memory to a state allowing reading/writing of data by the processor while the first clock is being supplied to the memory, and supplies, to the memory, a second control signal according to the reading/writing of data by the processor, after the second clock is supplied to the memory and the memory is initialized.

Figure 1:
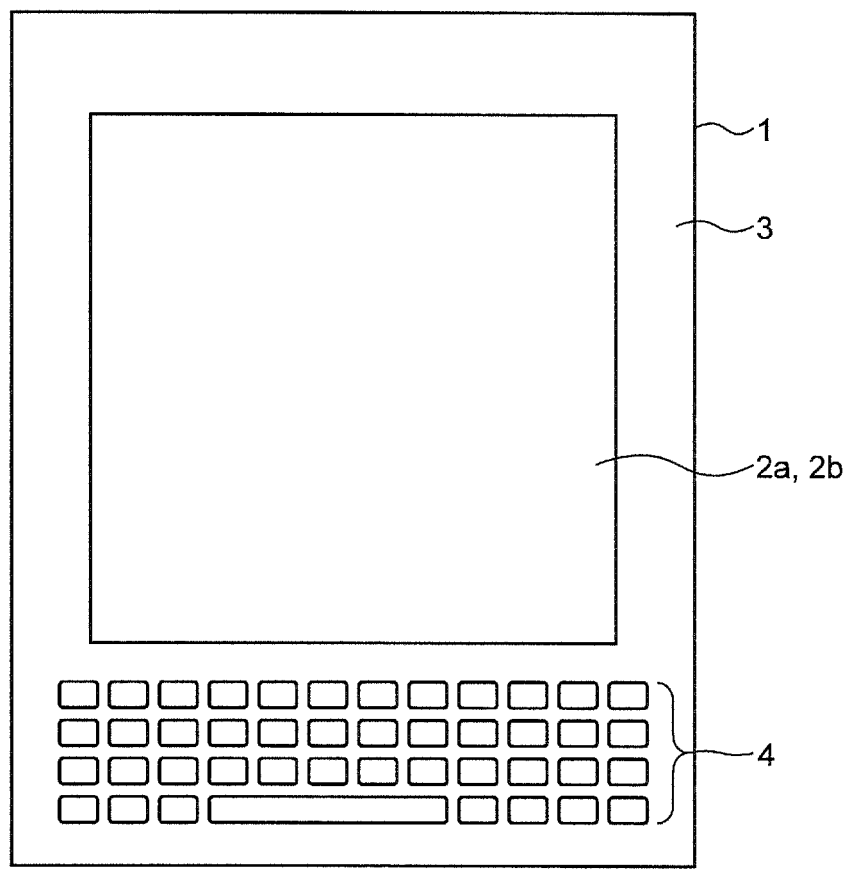
FIG. 1 is an outline view of an information processing device including a memory controller according to an embodiment.

FIG. 1 is a diagram illustrating an outline of an information processing device 1 including a memory controller according to the embodiment. The information processing device 1 is a tablet type information terminal device.

The information processing device 1 has a display unit 2a on a terminal surface thereof. For the display unit 2a, a reflective liquid crystal display with a low power consumption or electronic paper, for example, is used. The information processing device 1 also includes a solar cell 3 on parts except the display unit 2a on the terminal surface. The information processing device 1 also includes a touch panel 2b that functions as a pointing device on the surface of the display unit 2a. The information processing device 1 further includes a keyboard 4 at a position on the terminal surface that does not overlap with the display unit 2a. The keyboard 4 may be realized by placing the transparent touch panel 2b on the surface of the solar cell 3. Alternatively, the keyboard 4 may be realized as a mechanical keyboard using a transparent material or a material with little light blocking part.

Figure 2:
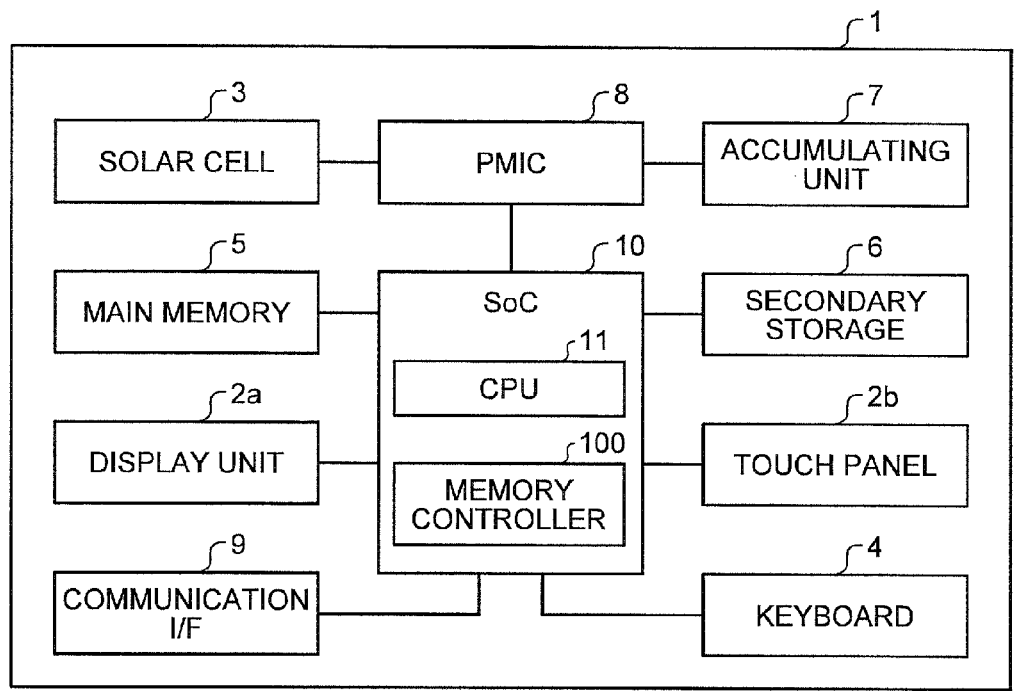
FIG. 2 is a block diagram illustrating an exemplary hardware configuration of the information processing device.

FIG. 2 is a block diagram illustrating an exemplary hardware configuration of the information processing device 1. The information processing device 1 includes, as a main hardware configuration, modules including a system-on-chip (SoC) 10, a main memory 5, a secondary storage 6, the solar cell 3, an accumulating unit 7, a power management integrated circuit (PMIC) 8, the display unit 2a, the touch panel 2b, the keyboard 4, and a communication interface (I/F) 9.

The information processing device 1 operates on power generated by the solar cell 3. The power generated by the solar cell 3 alone, however, cannot cover peak power consumption of the entire information processing device 1 in operation (when the information processing device 1 is performing some process). Accordingly, surplus power generated by the solar cell 3 is charged in the accumulating unit 7 during idle periods (such as periods during which a response from a user is being waited or periods during which the information processing device is not being used). Then, during operation, the PMIC 8 combines the power accumulated by the accumulating unit 7 and the power generated by the solar cell 3, adjusts the voltage thereof to a required voltage and supplies the adjusted power to the modules of the information processing device 1. Such power supply control is called peak assist or peak shift.

The accumulating unit 7 can be realized by a battery such as a lithium ion battery, an electric double layer capacitor or the like alone or in combination. For example, a possible combination is first accumulating power generated by the solar cell 3 in the electric double layer capacitor and then charging the accumulated power in the lithium ion battery.

The PMIC 8 is a module that supplies power to the modules such as the SoC 10 and the main memory 5. The PMIC 8 changes the voltage of power supplied from the solar cell 3 and the accumulating unit 7 to a voltage required by the modules such as the SoC 10 and the main memory 5, and supplies the power to the modules. The PMIC 8 has a function of turning power supply to the modules on/off.

The SoC 10 is a system LSI (semiconductor device) including a processor (central processing unit; CPU) 11 that is a core for controlling the entire information processing device 1, a memory controller (memory control device) 100 according to the embodiment, and the like mounted on a semiconductor substrate. Examples of specific configurations of the SoC 10 and the memory control device 100 will be described in detail later.

The main memory 5 is a memory from/to which data are read/written by the CPU 11 of the SoC 10 and is a main storage unit used as work areas when the CPU 11 performs various types of processing. Examples of the main memory 5 include a DRAM having synchronous interface such as a double data rate synchronous dynamic random access memory (DDR SDRAM), a double data rate 2 synchronous dynamic random access memory (DDR2 SDRAM), a double data rate 3 synchronous dynamic random access memory (DDR3 SDRAM), a low power double data rate synchronous dynamic random access memory (LPDDR SDRAM), and a low power double data rate 2 synchronous dynamic random access memory (LPDDR2 SDRAM).

The secondary storage 6 is an auxiliary storage unit using a nonvolatile memory that stores data and programs required by the information processing device 1. For the secondary storage 6, a flash memory, for example, may be used. Alternatively, the secondary storage 6 may be an SD card or an SSD.

The information processing device 1 includes the display unit 2a, the touch panel 2b, the keyboard 4 and the communication I/F 9 as input/output devices. The communication I/F 9 is an interface for communication through a wireless local area network (LAN), for example. The communication method is not limited to the wireless LAN but any methods such as a wired LAN, Bluetooth (registered trademark), Zig-Bee (registered trademark), infrared communication, visible light communication, an optical line network, a telephone line network and the Internet can be used.

Figure 3:
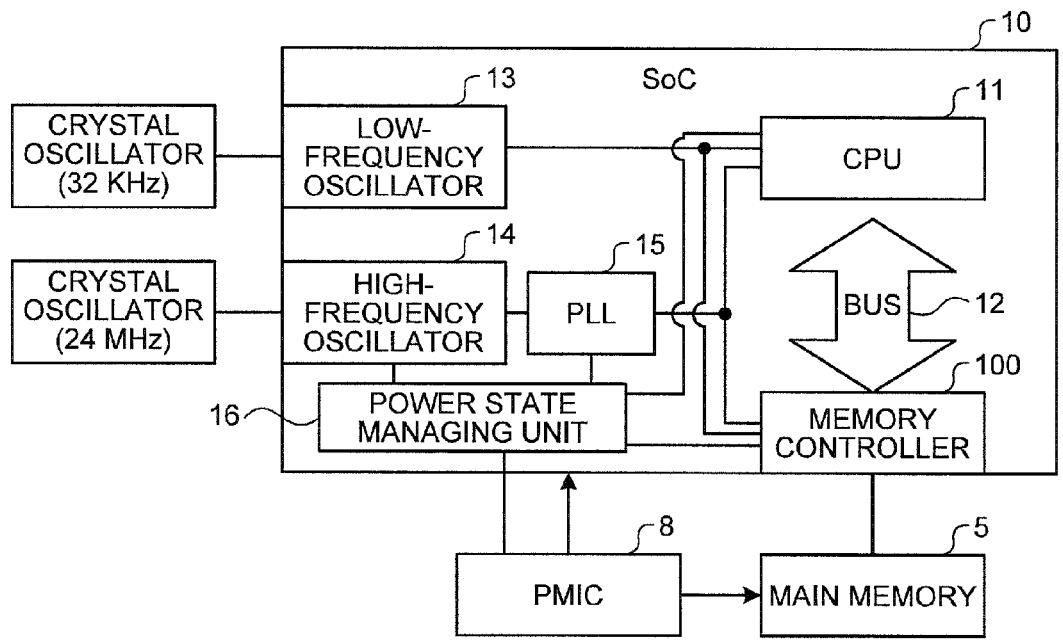
FIG. 3 is a block diagram illustrating an exemplary configuration of a main part of the information processing device.

FIG. 3 is a block diagram illustrating an exemplary configuration of a main part of the information processing device 1, in which the SoC 10, the main memory 5 and the PMIC 8 are selectively illustrated. These modules are mounted on a mother board (system board) of the information processing device 1, for example.

The SoC 10 includes the CPU 11 and the memory controller 100 as described above. The CPU 11 and the memory controller 100 are connected via a bus 12 formed on a chip. The SoC 10 is connected to the external main memory 5 via the memory controller 100. Power making the SoC 10 and the main memory 5 operate is supplied from the PMIC 8. Although not illustrated in FIG. 3, a controller for the input/output devices such as the display unit 2a, the touch panel 2b, the keyboard 4 and the communication I/F 9 may be provided in the SoC 10.

The SoC 10 also includes a low-frequency oscillator 13 and a high-frequency oscillator 14 to generate clocks for causing the system mounted on the chip to operate. The low-frequency oscillator 13 has a 32-KHz crystal oscillator connected thereto and oscillates, for example. The high-frequency oscillator 14 has a 24-MHz crystal oscillator connected thereto and oscillates, for example.

The output of the low-frequency oscillator 13 is supplied as a sub-clock to the CPU 11 and the memory controller 100, and used for starting the system mounted on the chip and operation in a standby state. The output of the high-frequency oscillator 14, on the other hand, is further increased in frequency by a phase locked loop (PLL) 15, then supplied to the CPU 11 and the memory controller 100, and used as a main clock when the CPU 11 performs various processes.

The SoC 10 further includes a power state managing unit 16 that controls the SoC 10 to enter a standby state in which power consumption is low during idle periods. When there is no task to be performed at once and an interrupt from the input/output devices is to be waited for, the CPU 11 issues a WFI (wait for interrupt) instruction and waits for an interrupt. At this time, the power state managing unit 16 causes the SoC 10 to enter a standby state so as to reduce power consumption while the CPU 11 is waiting for an interrupt. SoCs are often provided with a plurality of types of standby states with different power consumptions and different costs required for transition thereto and waking up therefrom. In a standby state with a low power consumption among such standby states, the power state managing unit 16 performs power gating of the modules in the SoC 10 and stops the high-frequency oscillator 14 to stop supply of the main clock. In this state, the power state managing unit 16 may also stop the PLL 15 at the same time in addition to the high-frequency oscillator 14. In this state, the power state managing unit 16 also instructs the PMIC 8 to stop power supply to the main memory 5 or instructs the memory controller 100 to switch from a state in which the main memory 5 is made to operate with a first power consumption to a state (such as a deep power down state or a self-refresh state) in which the main memory 5 is made to wait with a second power consumption that is smaller than the first power consumption so as to significantly reduce the power consumption.

When occurrence of an interrupt from the input/output devices is detected, the power state managing unit 16 disables power gating of the modules in the SoC 10 if such power gating is performed and resumes the operation of the high-frequency oscillator 14 and the PLL 15 if these modules are stopped. At this time, the power state managing unit 16 further instructs the PMIC 8 to resume power supply to the main memory 5 or instructs the memory controller 100 to switch from the state in which the main memory is made to wait with the second power consumption to the state in which the main memory 5 is made to operate with the first power consumption.

The power state managing unit 16 may output a standby signal indicating whether the SoC 10 is in a standby state or not, and instruct the PMIC 8 to stop or resume power supply to the main memory 5 or instruct the memory controller 100 to switch between the state in which the main memory 5 is made to operate with the first power consumption and the state in which the main memory 5 is made to wait with the second power consumption by using the standby signal. In this case, the PMIC 8 stops power supply to the main memory 5 when the standby signal is turned on and resumes power supply to the main memory 5 when the standby signal is turned off. Furthermore, in this case, the memory controller 100 sends a signal (command) to the main memory 5 to enter the state in which the main memory 5 waits with the second power consumption when the standby signal is turned on from off, and sends a signal (command) to the main memory 5 to enter the state in which the main memory 5 operates with the first power consumption when the standby signal is turned off from on. As an alternative method, the power state managing unit 16 may instructs the PMIC 8 of the memory controller 100 by using a dedicated signal line instead of using the standby signal.

Note that the power state managing unit 16 may also be referred to as a power reset manager, a general power controller or a low-leakage wake-up unit. Some or all of the functions of the power state managing unit 16 may be included in the CPU 11.

In a case where a volatile memory such as a DRAM as described above is used as the main memory 5, data will disappear when power supply to the main memory 5 is stopped, which is not a problem, however, if the data are those used for work by the CPU 11 in an executing state. If there are data that should not disappear, the data may be stored in another volatile memory to which power supply is not stopped even in a standby state or may be stored in another nonvolatile memory. Furthermore, a nonvolatile memory such as a PCM or an MRAM may be used as the main memory 5 so that data will not disappear when power supply to the main memory 5 is stopped.

When a DRAM is used as the main memory 5 and the main memory 5 is caused to enter the waiting state with the second power consumption, a self-refresh mode or a deep power-down mode of the DRAM can be used as the state in which the main memory 5 waits with the second power consumption.

The sub-clock generated by the low-frequency oscillator 13 cannot be stopped because the sub-clock is necessary for counting of a timer and monitoring an interrupt in the standby state and for state transition from the standby state to the operating state. The power consumption of the low-frequency oscillator 13 is small as compared to that of the high-frequency oscillator 14, and is therefore not a problem.

In the SoC 10 according to the embodiment, when the power state managing unit 16 exits the standby state to make the high-frequency oscillator 14 (and the PLL 15) to start operating and instruct the PMIC 8 to start power supply to the main memory 5 or instruct the memory controller 100 to resume the state in which the main memory 5 operates with the first power consumption from the state in which the main memory 5 waits with the second power consumption upon receipt of an interrupt from the input/output devices, the memory controller 100 starts initialization of the main memory 5 without waiting for the main clock to become stable so as to shorten the time for the CPU 11 to be ready for processing the interrupt.

Figure 4:
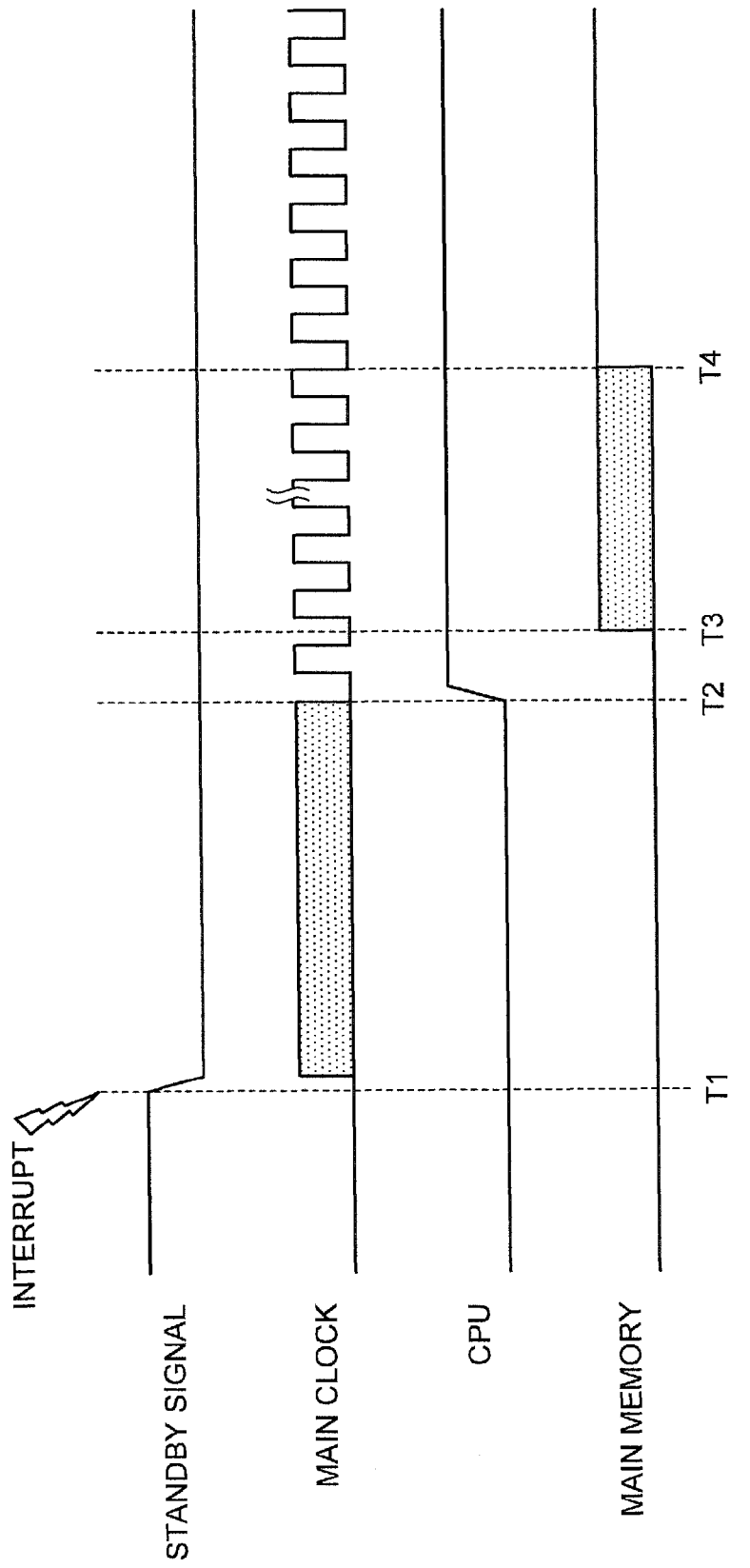
FIG. 4 is a timing chart for explaining operation for exiting standby according to the related art.

Typical operation for exiting standby according to the related art will be described here as a comparative example with respect to the embodiment with reference to FIG. 4. FIG. 4 is a timing chart of transition from a standby state to an operating state upon receipt of an interrupt by a typical SoC according to the related art. The configuration of the typical SoC according to the related art is similar to that of the SoC 10 according to the embodiment illustrated in FIG. 3 but differs from the embodiment in that the sub-clock generated by the low-frequency oscillator 13 is not supplied to the memory controller 100 and that the memory controller 100 does not perform operation based on the sub-clock. In the following description, components of the comparative example that correspond to those in the embodiment will be designated by reference numerals of the components in the embodiment with a suffix n added thereto for convenience sake.

When an interrupt is input to the CPU 11$n$ from any of the input/output devices at time T1, the standby state is exited by the power state managing unit 16 that has detected the interrupt. With the typical SoC 10$n$ according to the related art, a standby signal indicating a standby state is defined and the standby signal becomes low level when the standby state is exited. With this process, the power state managing unit 16 of the SoC 10$n$ first makes the high-frequency oscillator 14$n$ (and the PLL 15$n$ if necessary) start operating and waits until the oscillation of the high-frequency oscillator 14$n$ becomes stable. The output of the high-frequency oscillator 14$n$ is input to the PLL 15$n$, which increases the frequency thereof to generate the main clock. When power supply to the main memory 5$n$ is stopped in the standby state, the power state managing unit 16 of the SoC 10$n$ instructs the PMIC 8$n$ to start power supply to the main memory 5$n$ at the timing when the standby state is exited at time T1.

When the main clock becomes stable at time T2, the CPU 11$n$ becomes in a state capable of performing interrupt processing. At this point, however, initialization of the main memory 5$n$ is not finished, and the CPU 11$n$ therefore instructs the memory controller 100 to initialize the main memory 5$n$. If the main memory 5$n$ was made to enter the waiting state with the second power consumption in the standby state, the memory controller 100$n$ in receipt of the instruction from the CPU 11$n$ first makes the main memory 5$n$ enter the operating state with the first power consumption at this point. Then, at time T3, the memory controller 100$n$ in receipt of the instruction from the CPU 11$n$ starts initialization of the main memory 5$n$. When the initialization of the main memory 5$n$ is completed at time T4, the main memory 5$n$ enters a state allowing reading/writing of data. Then, the CPU 11$n$ performs interrupt processing by using the main memory 5$n$. Note that the memory controller 100$n$ may be a memory controller that starts initialization of the main memory 5$n$ in response to an instruction from the CPU 11$n$ as described above or may be a memory controller that starts initialization of the main memory 5$n$ in response to an instruction from the power state managing unit 16 having detected that the main clock became stable after exiting standby.

The initialization of the main memory 5$n$ is a process for initializing the main memory 5$n$ into a state allowing reading/writing of data by the CPU 11$n$ after the standby state is exited and power supply to the main memory 5$n$ is started or after the main memory 5$n$ is switched back from the waiting state with the second power consumption to the operating state with the first power consumption. Specifically, the initialization of the main memory 5$n$ is a process of setting parameters relating to the burst length and signal delay in a control register in the main memory 5$n$ after a predetermined time has elapsed since power supply to the main memory 5$n$ is started or a process of setting parameters relating to the burst length and signal delay in a control register in the main memory 5$n$ after a predetermined has elapsed since the main memory 5$n$ is switched back from the waiting state with the second power consumption to the operating state with the first power consumption.

Figure 5:
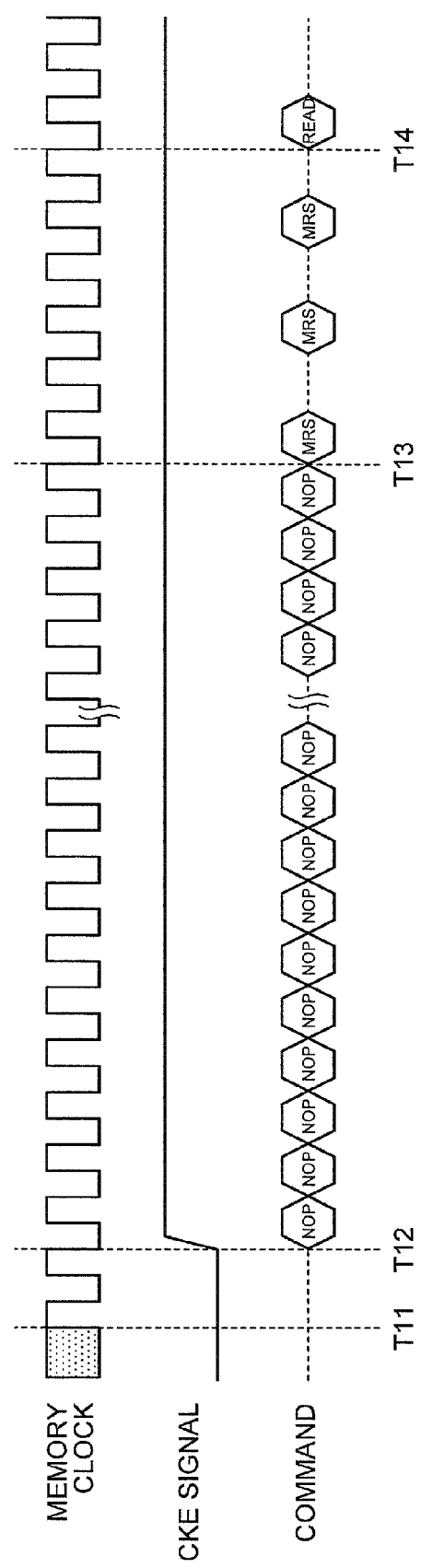
FIG. 5 is a timing chart for explaining a memory initialization process according to the related art.

A typical process of initializing the main memory 5$n$ according to the related art will be described here with reference to FIG. 5 assuming a case in which a DDR3 SDRAM is used as the main memory 5$n$ and in which power supply to the main memory 5$n$ is stopped in the standby state. FIG. 5 is a timing chart for explaining initialization of the main memory 5$n$ by a typical memory controller 100$n$ according to the related art.

In a case where the main memory 5$n$ is a memory having a synchronous interface such as a DDR3 SDRAM, the memory controller 100$n$ supplies commands (first control signal) for initializing the main memory 5$n$ in synchronization with a memory clock while supplying the memory clock to the main memory 5$n$ as illustrated in FIG. 5. In this process, the typical memory controller 100$n$ according to the related art supplies the main clock as described above without any change or a main clock obtained by changing the frequency thereof by a PLL or a flip-flop as a memory clock to the main memory 5n. Accordingly, the memory clock cannot be supplied to the main memory 5n and the main memory 5n cannot be stabilized until the main clock becomes stable.

Specifically, the typical memory controller 100n according to the related art waits until the main clock becomes stable after the standby state is exited and power supply to the main memory 5n is started. Then, when the main clock becomes stable at time T11, the memory controller 100n starts supply of the memory clock to the main memory 5n, and then continues to supply NOP (no operation) commands in synchronization with the memory clock to the main memory 5n for a predetermined period set in advance after a CKE (clock enable) signal has become high level at time T12. The CKE signal is a signal indicating whether the memory clock is valid or not. A high level CKE signal indicates that the memory clock is valid while a low level CKE signal indicates that the memory clock is invalid.

Then at time T13, when the predetermined time elapsed, the memory controller 100n supplies an MRS (mode register set) command for setting parameters relating to the burst length and signal delay in the control register in the main memory 5n in synchronization with the memory clock to the main memory 5n. Then, after the initialization of the main memory 5n is completed at time T14, the memory controller 100n supplies commands (second control signal) according to reading/writing data by the CPU 11n in synchronization with the memory clock to the main memory 5n. FIG. 5 illustrates an example in which a READ command requesting to read data is supplied to the main memory 5n.

As described above, the typical memory controller 100n according to the related art is configured to start power supply to the main memory 5n after the standby state is exited and further start initialization of the main memory 5n after the main clock has become stable. Accordingly, there is a problem that it takes time for the CPU 11n to be ready for reading/writing data from/to the main memory 5n, that is, the delay time from when an interrupt is input from any of the input/output devices until the CPU 11n starts interrupt processing becomes long.

Figure 6:
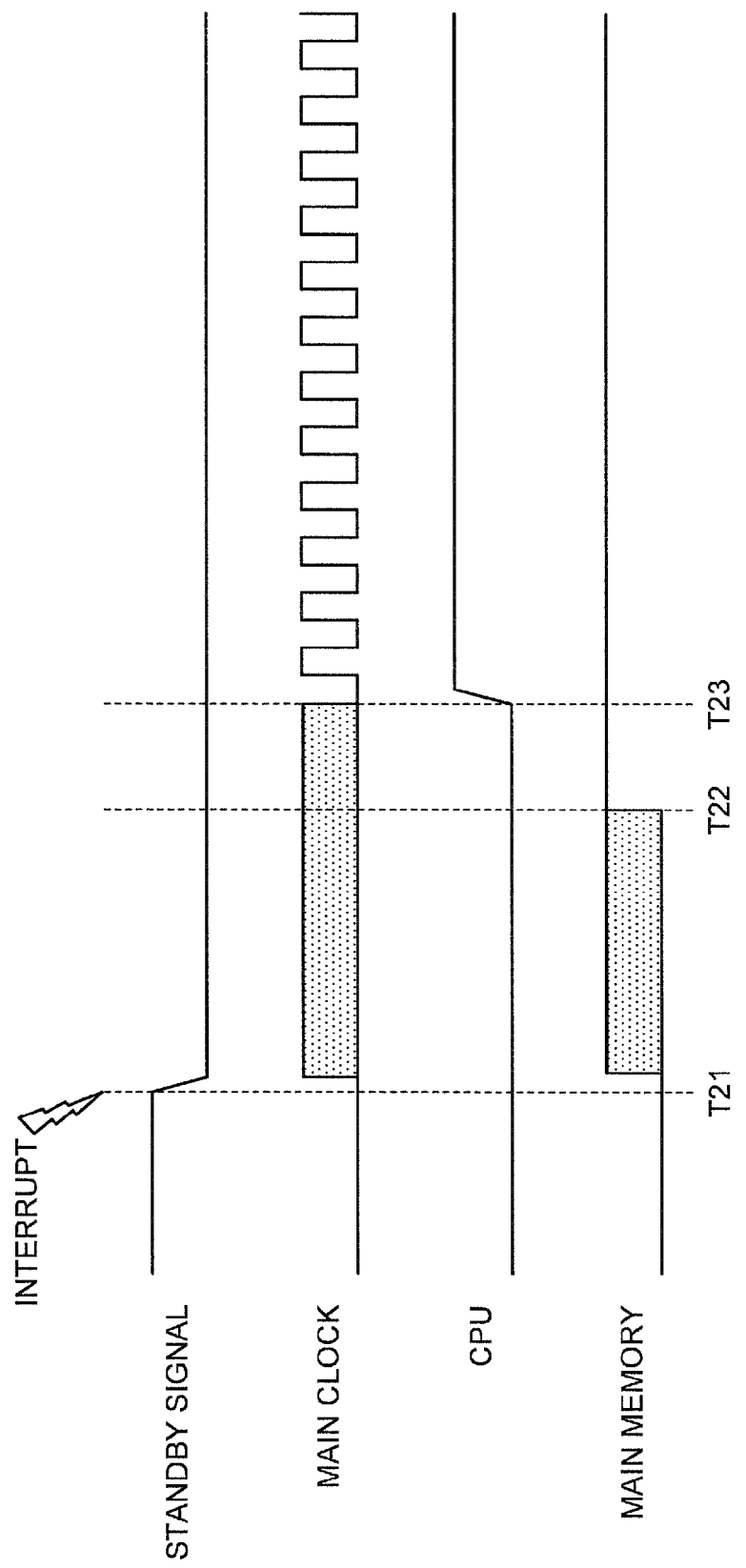
FIG. 6 is a timing chart for explaining operation for exiting standby according to the embodiment.

Next, operation for exiting standby according to the embodiment will be described with reference to FIG. 6. FIG. 6 is a timing chart of transition from the standby state to the operating state upon receipt of an interrupt by the SoC 10 according to the embodiment.

When an interrupt is input from any of the input/output devices at time T21, the standby state is exited by the power state managing unit 16 of the SoC 10 and the standby signal becomes low level. With this process, the power state managing unit 16 of the SoC 10 first makes the high-frequency oscillator 14 (and the PLL 15 if necessary) start operating. When power supply to the main memory 5 is stopped in the standby state, the power state managing unit 16 of the SoC 10 instructs the PMIC 8 to start power supply to the main memory 5 at the timing when the standby state is exited at time T21.

Since the sub-clock generated by the low-frequency oscillator 13 is supplied to the memory controller 100 of the embodiment as described above, the memory controller 100 can operate with the sub-clock before the main clock becomes stable. Thus, when the standby state is exited at time T21, the memory controller 100 of the embodiment starts initialization of the main memory 5 in response to the instruction from the power state managing unit 16 without waiting until the main clock becomes stable. If the main memory 5 was made to enter the waiting state with the second power consumption in the standby state, the memory controller 100 first makes the main memory 5 enter the operating state with the first power consumption at this point. Then, when the initialization of the main memory 5 is completed at time T22, the main memory 5 becomes in a state allowing reading/writing of data by the CPU 11.

When the main clock becomes stable at time T23 thereafter, the CPU 11 becomes in a state capable of performing interrupt processing. Since the initialization of the main memory 5 is already completed and the main memory 5 is in a state allowing reading/writing of data at this point, the CPU 11 can start interrupt processing at this point. As described above, since the initialization of the main memory 5 is performed without waiting until the main clock becomes stable after the standby state is exited and power supply to the main memory 5 is started according to the embodiment, the delay time from when an interrupt is input from any of the input/output devices and the standby state is exited until the CPU 11 starts interrupt processing can be made short.

Note that it is assumed that the time required for initialization of the main memory 5 is shorter than the time until the main clock becomes stable in the example illustrated in FIG. 6. If the time required for initialization of the main memory 5 is longer than the time until the main clock becomes stable, however, the CPU 11 needs to wait until the initialization of the main memory 5 is completed after the main clock has become stable before starting the interrupt processing. Even in this case, the delay time until the CPU 11 starts interrupt processing is shorter than that in the case in which initialization of the main memory 5n is started after the main clock has become stable as in the related art.

Figure 7:
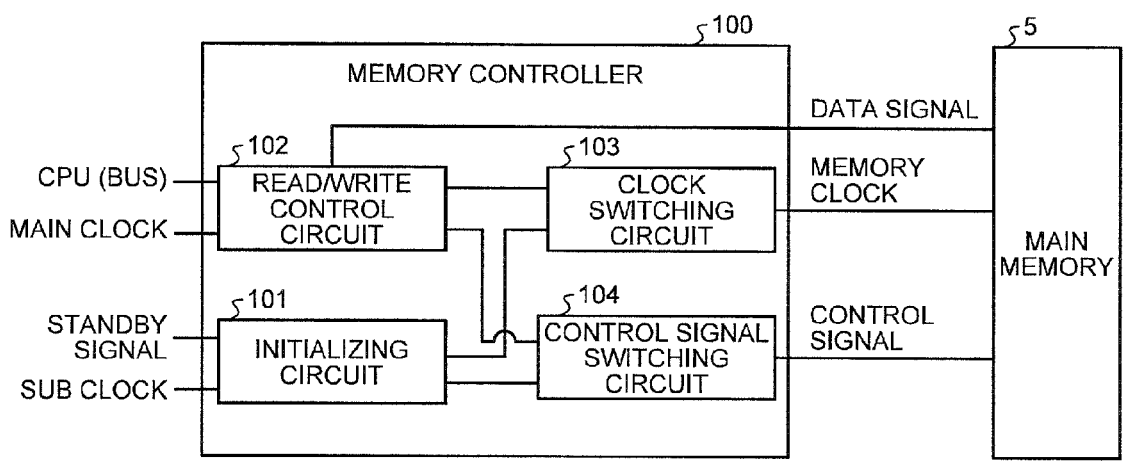
FIG. 7 is a block diagram illustrating an exemplary configuration of the memory controller according to the embodiment.

FIG. 7 is a block diagram illustrating an exemplary configuration of the memory controller 100 according to the embodiment for implementing the operation for exiting standby as illustrated in FIG. 6. The memory controller 100 according to the embodiment is connected with the CPU 11 via the bus 12 and receives as input two types of clocks, which are the main clock at a high frequency and the sub-clock at a low frequency, and a standby signal from the power state managing unit 16.

A clock obtained by increasing the frequency of the output from the high-frequency oscillator 14 of the SoC 10 by the PLL 15 is used as the main clock. The main clock is stopped in the standby state. On the other hand, the output from the low-frequency oscillator 13 of the SoC 10 is used without any change as the sub-clock. Alternatively, a clock obtained by increasing the frequency of the output from the low-frequency oscillator 13 of the SoC 10 by a PLL different from the PLL 15 may be used as the sub-clock. The sub-clock is not stopped even in the standby state. The frequencies of the main clock and the sub-clock input to the memory controller 100 is determined within a range in which the main memory 5 connected to the memory controller 100 can operate.

The standby signal from the power state managing unit 16 is a signal that becomes high level (also be referred to as ON, asserted or active) in the standby state and becomes low level (also be referred to as OFF, deasserted or inactive) when the standby state is exited as in the related art.

The memory controller 100 and the main memory 5 are connected via signal lines defined by specifications of the memory interfaces thereof as illustrated in FIG. 7. The signal lines connecting the memory controller 100 and the main memory 5 are roughly classified into a data signal line, a memory clock signal line and a control signal line. The data signal line is a signal line through which data read/written by the CPU 11 from/to the main memory 5 are transmitted and has a width of 16 bits or 32 bits. The memory clock signal line is a signal line through which the main clock to synchronize transmission and reception of data and control signals between the memory controller 100 and the main memory 5. The control signal line is a signal line for transmitting addresses, bank specification and commands, a plurality of control signal lines is used depending on the types of signals transmitted therethrough.

The memory controller 100 according to the embodiment includes, for example, an initializing circuit 101, a read/write control circuit 102, a clock switching circuit 103, and a control signal switching circuit 104 as illustrated in FIG. 7.

The initializing circuit 101 operates with the sub-clock at a low frequency, and when exit from the standby state is informed as a result of turning the standby signal off by the power state managing unit 16, generates at least part of the first half (an NOP command, for example) of a control signal (first control signal) necessary for initialization of the main memory 5 and supplies the generated part of the control signal to the control signal switching circuit 104. In the case where the main memory 5 is in the waiting state with the second power consumption in the standby state, the initializing circuit 101 inserts at this point a control signal (command) for switching the main memory 5 to the operating state with the first power consumption at the beginning of the control signal (first control signal) necessary for the initialization of the main memory 5 and supplies the control signal to the control signal switching circuit 104. When the exit from the standby state is informed by the standby signal, the initializing circuit 101 also supplies the input sub-clock without any change or a sub-clock obtained by changing the frequency of the input sub-clock by a PLL or a flip-flop therein to the clock switching circuit 103. Hereinafter, the clock at a low frequency supplied from the initializing circuit 101 to the clock switching circuit 103 will be referred to as a first clock. If the sub-clock is used as the first clock without changing the frequency thereof, the sub-clock input to the memory controller 100 may be directly input to the clock switching circuit 103.

The read/write control circuit 102 operates with the main clock at a high frequency, and in accordance with an instruction for memory access supplied from the CPU 11 via the bus 12, generates a control signal (second control signal) according to reading/writing data from/to the main memory 5, supplies the generated control signal to the control signal switching circuit 104, and also transmits/receives data read/written by the CPU 11 from/to the main memory 5 by using the data signal line. In a case where the initialization of the main memory 5 is not completed even when the main clock has become stable or in like cases, the read/write control circuit 102 generates part of the latter half (an MRS command, for example) of the control signal (first control signal) necessary for initialization of the main memory 5 and supplies the generated part of the control signal to the control signal switching circuit 104 before generating the control signal (second control signal) according to reading/writing data from/to the main memory 5. The read/write control circuit 102 also supplies the input main clock without any change or a main clock obtained by changing the frequency thereof by a PLL or a flip-flop to the clock switching circuit 103. Hereinafter, the clock at a high frequency supplied from the read/write control circuit 102 to the clock switching circuit 103 will be referred to as a second clock. If the main clock is used as the second clock without changing the frequency thereof, the main clock input to the memory controller 100 may be directly input to the clock switching circuit 103.

Since the read/write control circuit 102 operates with the main clock similarly to the typical memory controller 100*n* according to the related art, the read/write control circuit 102 cannot operate after the standby state is exited until the main clock becomes stable.

In the case where the main memory 5 is made to wait with the second power consumption in the standby state, a configuration in which the standby signal is also connected to the read/write control circuit 102 is used, for example. The read/write control circuit 102 having detected that the standby signal is turned on from off then sends a control signal (command) for switching to the waiting state with the second power consumption to the main memory 5. As an alternative method, there is also a method in which the CPU 11 instructs the memory controller 100, at a point when the standby state is entered, to send a control signal (command) for switching the main memory 5 to the waiting state with the second power consumption. In this case, the standby signal need not be connected to the read/write control circuit 102. In the case where power supply to the main memory 5 is stopped in the standby state, the standby signal need not be connected to the read/write control circuit 102, either.

The clock switching circuit 103 receives as input the first clock at the low frequency from the initializing circuit 101 and the second clock at the high frequency from the read/write control circuit 102, supplies the first clock as the memory clock to the main memory 5 until the second clock becomes stable and supplies the second clock as the memory clock to the main memory 5 after the second clock has become stable.

While the clock switching circuit 103 is supplying the first clock as the memory clock to the main memory 5, the control signal switching circuit 104 starts supplying the first control signal generated by the initializing circuit 101 to the main memory 5. The control signal switching circuit 104 continues to supply the first control signal generated by the initializing circuit 101 to the main memory 5, and if the initialization of the main memory 5 is not completed even when the memory clock supplied to the main memory 5 is switched from the first clock to the second clock by the clock switching circuit 103, then supplies the first control signal generated by the read/write control circuit 102 to the main memory 5. After the memory clock supplied to the main memory 5 is switched from the first clock to the second clock by the clock switching circuit 103 and after the initialization of the main memory 5 is completed, the control signal switching circuit 104 supplies the second control signal generated by the read/write control circuit 102 to the main memory 5.

Examples of the method by which the memory controller 100 is informed that the second clock has become stable include a method of informing the memory controller 100 that the second clock has become stable by the power state managing unit 16, a method of using a signal indicating that the main clock in the SoC 10 is valid, a method of determining that the second clock is stable when a predetermined time has elapsed since standby was exited on the basis of the standby signal, and a method of providing instruction to the memory controller 100 when the CPU 11 starts performing interrupt processing.

Figure 8:
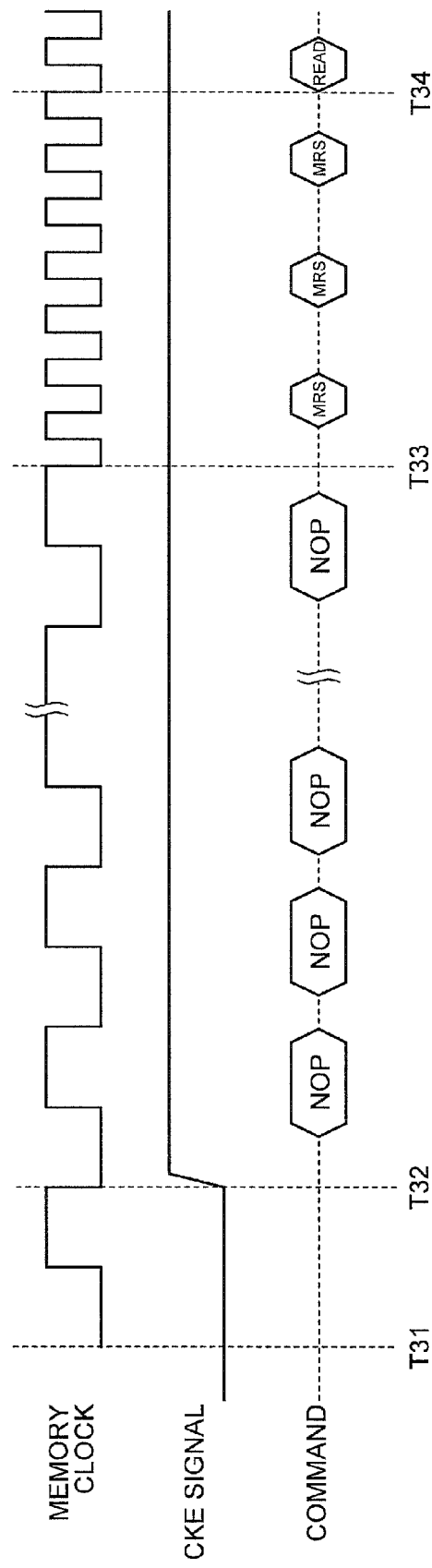
FIG. 8 is a timing chart for explaining a memory initialization process according to the embodiment.

Next, a process of initializing the main memory 5 by the memory controller 100 according to the embodiment will be described with reference to FIG. 8 assuming a case in which a DDR3 SDRAM is used as the main memory 5 and in which power supply to the main memory 5 is stopped in the standby state. FIG. 8 is a timing chart for explaining initialization of the main memory 5 by the memory controller 100 according to the embodiment.

When the standby state is exited and power supply from the PMIC 8 to the main memory 5 is started at time T31, the memory controller 100 of the embodiment first supplies the first clock at the low frequency as the memory clock to the main memory 5. The clock generated on the basis of the sub-clock or the sub-clock without any change is used as the first clock as described above. Then, the memory controller 100 supplies a high level CKE signal indicating that the memory clock is valid to the main memory 5 at time T32, and thereafter continues to supply NOP commands (first control signal) in synchronization with the memory clock during a predetermined time.

When the main clock has become stable, the memory controller 100 switches the memory clock supplied to the main memory 5 from the first clock at the low frequency to the second clock at the high frequency at time T33. The clock generated on the basis of the main clock or the main clock without any change is used as the second clock as described above. If the initialization of the main memory 5 is not completed at this point, the memory controller 100 continues the initialization based on the main clock and supplies the rest of commands necessary for the initialization in synchronization with the memory clock switched to the second clock to the main memory 5. In the example illustrated in FIG. 8, MRS commands (first control signal) are supplied in synchronization with the memory clock switched to the second clock to the main memory 5.

Then, after the initialization of the main memory 5 is completed at time T34, the memory controller 100 supplies commands (second control signal) according to reading/writing data by the CPU 11 in synchronization with the memory clock switched to the second clock to the main memory 5. FIG. 8 illustrates an example in which a READ command requesting to read data is supplied to the main memory 5. If the initialization of the main memory 5 is completed at the point (time T33) when the memory clock supplied to the main memory 5 is switched from the first clock to the second clock, the commands according to reading/writing data by the CPU 11 can be supplied to the main memory 5 immediately thereafter.

Figure 9:
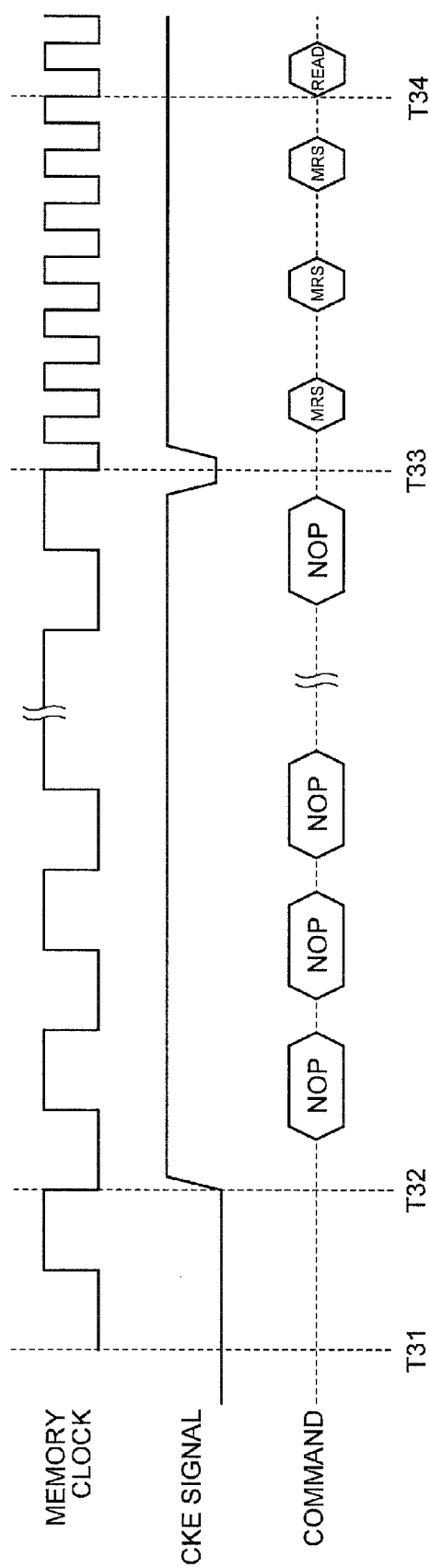
FIG. 9 is a timing chart for explaining another example of the memory initialization process according to the embodiment.

Note that, in the example illustrated in FIG. 8, the CKE signal is still high level when the memory clock supplied to the main memory 5 is switched from the first clock at the low frequency to the second clock at the high frequency. Alternatively, however, the CKE signal may be once made low level when the frequency of the memory clock is switched and then returned to high level as illustrated in FIG. 9.

Figure 10:
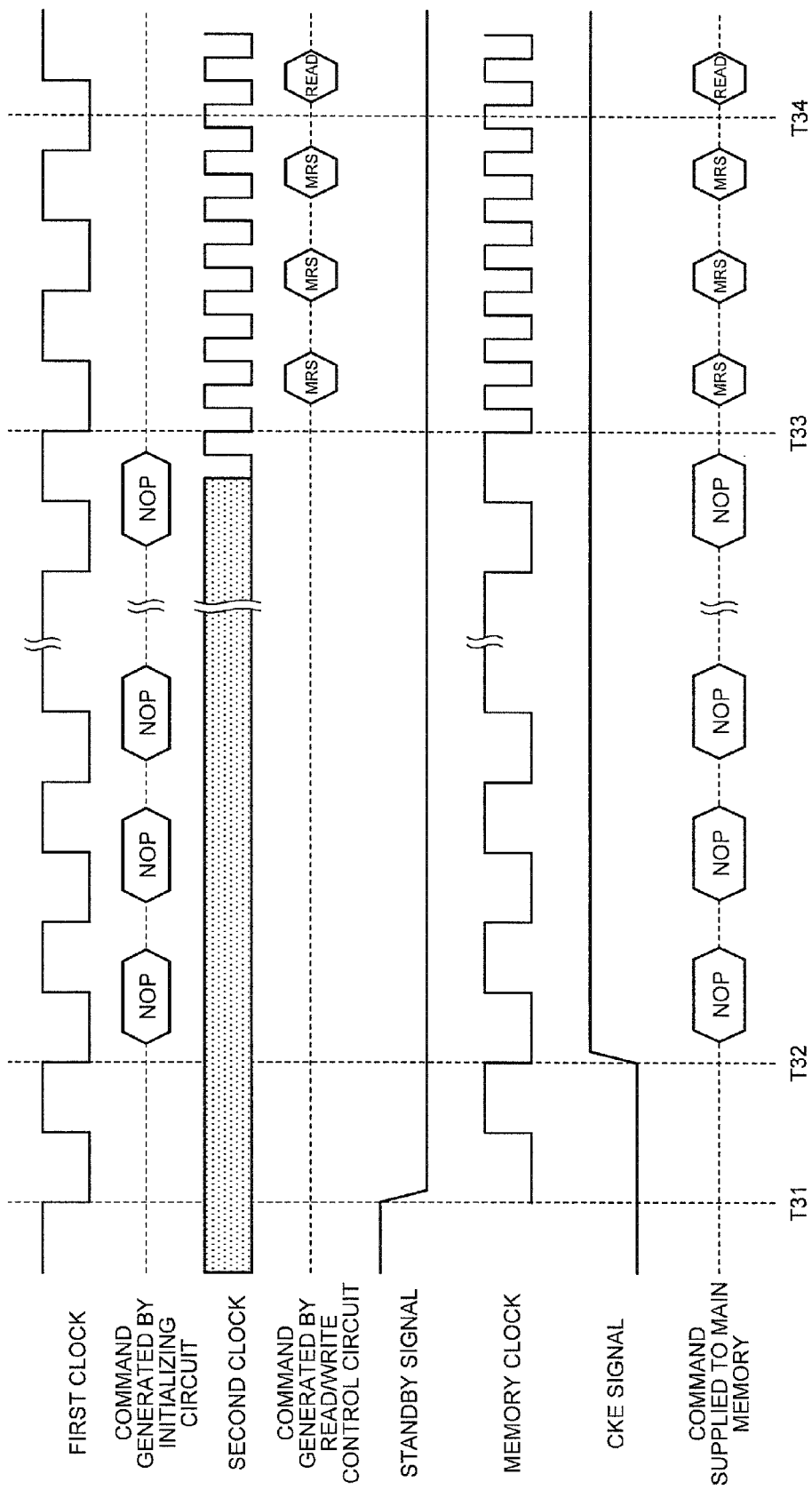
FIG. 10 is a timing chart for explaining operation of the memory controller according to the embodiment.

FIG. 10 is a timing chart for explaining operation of the memory controller 100 in performing the initialization process illustrated in FIG. 8.

The initializing circuit 101 receives the sub-clock and the standby signal as input, and when the standby state is exited and the standby signal becomes low level at time T31, inputs the first clock at the low frequency generated on the basis of the sub-clock or using the sub-clock without any change to the clock switching circuit 103. When the standby state is exited, the initializing circuit 101 also generates commands necessary for initialization of the main memory 5 and inputs the generated commands to the control signal switching circuit 104. Specifically, after the CKE signal has become high level at time T32, the initializing circuit 101 generates NOP commands and input the generated NOP commands to the control signal switching circuit 104 for a predetermined time.

The read/write control circuit 102 receives the main clock as input, and when the main clock has become stable, starts operating and inputs the second clock at the high frequency generated on the basis of the main clock or using the main clock without any change to the clock switching circuit 103. If the initialization of the main memory 5 is not completed when the main clock has become stable and the read/write control circuit 102 starts operating, the read/write control circuit 102 also generates the rest (MRS commands in the example of FIGS. 8 and 10) of the commands necessary for the initialization and inputs the generated commands to the control signal switching circuit 104. When the initialization of the main memory 5 is completed at time T34, the read/write control circuit 102 then generates commands (READ commands in the example of FIGS. 8 and 10) according to reading/writing data by the CPU 11 and inputs the generated commands to the control signal switching circuit 104.

The clock switching circuit 103 receives the first clock and the second clock as input, and supplies the first clock as the memory clock to the main memory 5 until the main clock becomes stable. The clock switching circuit 103 then supplies the second clock as the memory clock to the main memory 5 after the main clock has become stable (after time T33).

The control signal switching circuit 104 receives commands generated by the initializing circuit 101 and commands generated by the read/write control circuit 102 as input, and supplies the commands generated by the initializing circuit 101 to the main memory 5 in synchronization with the first clock until the main clock becomes stable. After the main clock has become stable (after time T33), the control signal switching circuit 104 supplies the commands generated by the read/write control circuit 102 to the main memory 5 in synchronization with the second clock.

Note that, in the example of FIGS. 8 and 10, a case in which the time required for initialization of the main memory 5 is longer than the time from when the standby state is exited until the main clock becomes stable is assumed and the latter half part of the commands required for initialization of the main memory 5 is generated by the read/write control circuit 102. Alternatively, however, if the initialization of the main memory 5 is completed before the main clock becomes stable, all the commands required for initialization of the main memory 5 may be generated by the initializing circuit 101 and the read/write control circuit 102 may generate only commands according to reading/writing data by the CPU 11.

In the case where a DDR3 SDRAM is used as the main memory 5, the memory controller 100 continues to supply NOP commands to the main memory 5 for a predetermined time since the CKE signal became high level, and supplies MRS commands to the main memory 5 after the predetermined time has elapsed. Although the commands supplied to the main memory 5 are switched from the NOP commands to the MRS commands when the main clock supplied to the main memory 5 is switched from the first clock to the second clock in FIGS. 8 and 10 for simplification of the description, the switching is not limited thereto.

Specifically, if the predetermined time is longer than the time until the main clock becomes stable, the read/write control circuit 102 generates the NOP commands until the predetermined time elapses, generates the MRS commands after the predetermined time has elapsed, and when the initialization of the main memory 5 is completed thereafter, generates READ commands and the like according to reading/writing data by the CPU 11 as illustrated in FIG. 11. In this case, the control signal switching circuit 104 supplies the NOP commands generated by the initializing circuit 101 to the main memory 5 until the main clock becomes stable and the memory clock supplied to the main memory 5 is switched from the first clock to the second clock, and supplies the NOP commands generated by the read/write control circuit 102 to the main memory 5 after the main clock has become stable and until the predetermined time elapses. Then, when the predetermined time has elapsed, the control signal switching circuit 104 supplies the MRS commands generated by the read/write control circuit 102 to the main memory 5, and when the initialization of the main memory 5 is completed, supplies the READ commands or the like generated by the read/write control circuit 102 to the main memory 5.

If the predetermined time is shorter than the time until the main clock becomes stable, on the other hand, the initializing circuit 101 generates the MRS commands after the predetermined time has elapsed as illustrated in FIG. 12. If the initialization of the main memory 5 is not completed when the main clock has become stable and the memory clock supplied to the main memory 5 is switched from the first clock to the second clock, the read/write control circuit 102 generates the MRS commands until the initialization of the main memory 5 is completed. In this case, the control signal switching circuit 104 sequentially supplies the NOP commands and the MRS commands generated by the initializing circuit 101 to the main memory 5 until the main clock becomes stable and the memory clock supplied to the main memory 5 is switched from the first clock to the second clock, supplies the MRS commands generated by the read/write control circuit 102 to the main memory 5 after the main clock has become stable until the initialization of the main memory 5 is completed, and supplies the READ commands or the like generated by the read/write control circuit 102 to the main memory 5 when the initialization of the main memory 5 is completed.

The operation of the memory controller 100 when the standby state is exited has been described above. When the SoC 10 enters the standby state, on the other hand, the power state managing unit 16 of the SoC 10 instructs the PMIC 8 to stop power supply to the main memory 5 or instructs the memory controller to change the main memory 5 from the operating state with the first power consumption to the waiting state with the second power consumption.

As described above, when the standby state is exited and the power supply too the main memory 5 is started or the main memory 5 is returned to the operating state with the first power consumption from the waiting state with the second power consumption, the memory controller 100 according to the embodiment starts initialization of the main memory 5 without waiting until the main clock becomes stable, which can reduce the delay time from when the standby state is exited until the CPU 11 starts interrupt processing.

While an example in which a DRAM is used as the main memory 5 is described in the embodiments described above, various random access memories such as a static random access memory (SRAM), a ferroelectric random access memory (FeRAM), a phase change memory (PCM), a magnetoresistive random access memory (MRAM), a resistance random access memory (ReRAM) and an NOR Flash can be used as the main memory 5 in addition to the DRAM. In this case, commands required for initialization of the main memory 5 vary depending on the type of the interface of the memory used as the main memory 5, and the memory controller 100 may supply commands according to the type of the interface of the memory used as the main memory 5 to the main memory 5.

While the embodiment described above is an example that is applied to the memory controller 100 connected to the main memory 5, the memory controller to which the embodiment is applied is not limited to this example. For example, the embodiment can be applied to a memory controller connected to a memory different from the main memory 5.

As described in detail above by way of specific examples, it is possible to reduce the power consumption and shorten the time until a process becomes ready for reading/writing data from/to a memory according to the memory controller 100 of the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory control device that controls a memory from/to which data are read/written by a processor, the memory control device comprising:
    a clock switcher configured to
        receive a first clock and a second clock of which clock frequency is higher than that of the first clock, the second clock being a clock generated by a high-frequency oscillator that starts operating in response to an input of an interrupt to the processor,
        supply the first clock to the memory until the second clock becomes stable, and
        supply the second clock to the memory after the second clock has become stable; and
    a control signal switcher configured to
        start supplying, to the memory to which the first clock is being supplied, a first control signal for initializing the memory to a state allowing reading/writing of data by the processor when the interrupt is input to the processor, and
        supply, to the memory, a second control signal according to the reading/writing of data by the processor, after the second clock is supplied to the memory and the memory is initialized.

2. The device according to claim 1, wherein
    power supply to the memory is stopped in a standby state in which the processor waits for the interrupt, and
    the first control signal is a signal for setting a parameter in a register of the memory after a predetermined time has passed since power supply to the memory is started.

3. The device according to claim 2, wherein the control signal switcher starts supplying the first control signal to the memory when the standby state is exited.

4. The device according to claim 2, wherein the control signal switcher starts supplying the first control signal to the memory when power supply to the memory is started.

5. The device according to claim 1, wherein
    the memory is changed from a state in which the memory operates with a first power consumption to a state in which the memory waits with a second power consumption smaller than the first power consumption when the processor is in a standby state waiting for the interrupt, and
    the first control signal is a signal for setting a parameter in a register of the memory after a predetermined time has passed since the memory is returned from the state in which the memory waits with the second power consumption to the state in which the memory operates with the first power consumption.

6. The device according to claim 5, wherein the control signal switcher starts supplying the first control signal to the memory when the standby state is exited.

7. The device according to claim 5, wherein the control signal switcher starts supplying the first control signal to the memory when the memory is returned from the state in which the memory waits with the second power consumption to the state in which the memory operates with the first power consumption.

8. A semiconductor device comprising a processor and a memory control device that controls a memory from/to which data are read/written by the processor, the processor and the memory control device being mounted on a semiconductor substrate, wherein
the memory control device includes:
a clock switcher configured to
receive a first clock and a second clock of which clock frequency is higher than that of the first clock, the second clock being a clock generated by a high-frequency oscillator that starts operating in response to an input of an interrupt to the processor,
supply the first clock to the memory until the second clock becomes stable, and
supply the second clock to the memory after the second clock has become stable; and
a control signal switcher configured to
start supplying, to the memory to which the first clock is being supplied, a first control signal for initializing the memory to a state allowing reading/writing of data by the processor when the interrupt is input to the processor, and
supply, to the memory, a second control signal according to the reading/writing of data by the processor, after the second clock is supplied to the memory and the memory is initialized.

9. A system board comprising a processor, a memory from/to which data are read/written by the processor and a memory control device that controls the memory mounted thereon, wherein
the memory control device includes:
a clock switcher configured to
receive a first clock and a second clock of which clock frequency is higher than that of the first clock, the second clock being a clock generated by a high-frequency oscillator that starts operating in response to an input of an interrupt to the processor,
supply the first clock to the memory until the second clock becomes stable, and
supply the second clock to the memory after the second clock has become stable; and
a control signal switcher configured to
start supplying, to the memory to which the first clock is being supplied, a first control signal for initializing the memory to a state allowing reading/writing of data by the processor when the interrupt is input to the processor, and
supply, to the memory, a second control signal according to the reading/writing of data by the processor, after the second clock is supplied to the memory and the memory is initialized.

10. A memory control device that controls a memory from/to which data are read/written by a processor, wherein
the memory control device
when an interrupt is input to the processor, starts supplying a first control signal for initializing the memory into a state allowing reading/writing of data by the processor to the memory to which a first clock is being supplied,
keeps on supplying the first clock to the memory until a second clock of which clock frequency is higher than that of the first clock has become stable, the second clock being a clock generated by a high-frequency oscillator that starts operating in response to the input of the interrupt to the processor,
switches the clock supplied to the memory from the first clock to the second clock after the second clock has become stable, and
supplies, to the memory, a second control signal according to the reading/writing of data by the processor after supplying the second clock to the memory and after the memory is initialized.

11. A memory control method of controlling a memory from/to which data are read/written by a processor, the method comprising:
receiving a first clock and a second clock of which clock frequency is higher than that of the first clock, the second clock being a clock generated by a high-frequency oscillator that starts operating in response to an input of an interrupt to the processor;
supplying the first clock to the memory until the second clock becomes stable;
starting supplying, to the memory to which the first clock is being supplied, a first control signal for initializing the memory to a state allowing reading/writing of data by the processor when the interrupt is input to the processor;
supplying the second clock to the memory after the second clock has become stable; and
supplying, to the memory, a second control signal according to the reading/writing of data by the processor, after the second clock is supplied to the memory and the memory is initialized.

12. A memory control method of controlling a memory from/to which data are read/written by a processor, the method comprising:
starting, when an interrupt is input to the processor, supplying a first control signal for initializing the memory into a state allowing reading/writing of data by the processor to the memory to which a first clock is being supplied;
keeping on supplying the first clock to the memory until a second clock of which clock frequency is higher than that of the first clock has become stable, the second clock being a clock generated by a high-frequency oscillator that starts operating in response to the input of the interrupt to the processor;
switching the clock supplied to the memory from the first clock to the second clock after the second clock has become stable; and
supplying, to the memory, a second control signal according to the reading/writing of data by the processor after supplying the second clock to the memory and after the memory is initialized.

* * * * *